Nov. 28, 1933.                    W. M. PIATT                    1,937,434
                                SEWAGE TREATMENT
                            Filed Aug. 20, 1931           6 Sheets-Sheet 1

Inventor:
W. M. Piatt,
by Karl Fenning
his Atty.

Nov. 28, 1933.  W. M. PIATT  1,937,434
SEWAGE TREATMENT
Filed Aug. 20, 1931   6 Sheets-Sheet 2

Inventor:
W. M. Piatt,
by Carl Finnwig
his Att'y.

Nov. 28, 1933.   W. M. PIATT   1,937,434
SEWAGE TREATMENT
Filed Aug. 20, 1931   6 Sheets-Sheet 3

Inventor:
W. M. Piatt,
by Carl Fenning
his Att'y.

Nov. 28, 1933.  W. M. PIATT  1,937,434
SEWAGE TREATMENT
Filed Aug. 20, 1931   6 Sheets-Sheet 4

Inventor:
W. M. Piatt,
by Carl Fruning
his Att'y.

Nov. 28, 1933.  W. M. PIATT  1,937,434
SEWAGE TREATMENT
Filed Aug. 20, 1931  6 Sheets-Sheet 5

Nov. 28, 1933.  W. M. PIATT  1,937,434
SEWAGE TREATMENT
Filed Aug. 20, 1931   6 Sheets-Sheet 6

Inventor:
W. M. Piatt,
by Carl Fenning
his Att'y.

Patented Nov. 28, 1933

1,937,434

UNITED STATES PATENT OFFICE 1,937,434

SEWAGE TREATMENT

William M. Piatt, Durham, N. C.

Application August 20, 1931. Serial No. 558,399

16 Claims. (Cl. 210—8)

The present invention relates particularly to the activated sludge treatment of sewage. This method of sewage treatment employs a tank through which the sewage is passed and in which it is mixed with previously activated sludge and subjected to the action of bacteria. In some instances before being admitted to the treatment tanks sewage is separated from such mechanically carried materials as stone, sand, gravel, glass, pieces of metal, etc., as well as the settable organic solids. This preliminary treatment is merely a separation process and while it may remove organic matter which otherwise might need treatment, has no technical effect upon the condition of the remaining sewage itself and in certain instances may be entirely omitted. The treatment of the sewage itself is usually carried out in large tanks which may be from ten to twenty times as long as they are wide. An inlet for sewage may be provided at one end and an outlet at the other end so that there is a continuous flow of sewage mixed with activated sludge through the tank. Ordinarily the speed of movement of the sewage through the tank is slow so that the sewage may remain in the tank a sufficient length of time to allow the bacteria to properly act upon the sewage. In order to procure proper action it is essential that the entire body of sewage in the tank be kept in substantially constant movement so as to avoid any settling and separation out of heavier or more solid particles. Such a separation or settling may result in a souring of the sewage interfering with the proper bacterial action and requiring cessation of activities to clean and restart the plant. A purpose, therefore, of the present invention is to provide a sewage treatment tank in which the sewage may be constantly kept in motion so as to prevent settlement and to keep the heavier solid portions in suspension and constantly distributed where they will be subjected to bacterial action.

Oxygen seems to be necessary to support the bacterial action and a purpose of the present invention is to make it possible for the sewage to receive and absorb as much oxygen as may be necessary to support the bacterial action. It may be observed, however, that the amount of oxygen required seems to be relatively small and its introduction while apparently necessary may be easy of accomplishment.

It has been proposed to combine the forward movement of the sewage longitudinally through the tank with a rotary movement of the sewage about the tank as the sewage progresses therethrough producing what may be termed a spiral movement of the sewage. This has the apparent advantage of increasing the length of travel of the sewage in the tank and allowing it to be constantly distributed during movement therethrough. A circumferential surface layer of greater or less depth around the sides, top and bottom of the tank is kept constantly in more or less rapid movement and there the bacterial action progresses satisfactorily. At the same time, however, there seems to be a more slowly rotating central core within the surface in which more or less solid constituents of the sewage may congregate and remain substantially unaffected by the bacterial action. There is no distinct separation of the two layers but the portion of the rotating mass further from the center moves more rapidly and generally the air is added to the outer portion of the contents of the tank. This condition may not be observed normally during the operation of the tank but its results will appear in the excessive settlement of untreated sewage on cessation of operation or may appear when sewage as withdrawn from the tank includes unpurified portions. A purpose of the present invention is to improve the spiral circulation by providing means for breaking up and distributing the central core or other means for preventing its formation so that all of the sewage may be more effectively acted on by the bacteria. To this end it may be desirable to provide at stations along the length of the tank means for diverting the slowly moving material in the central core outwardly into the more rapidly moving circumferential layer where it may be kept in movement and subjected to the purifying action of the bacteria or means may be provided for causing such a circulation that there will be substantially no core or unmixed portion of the sewage.

Other purposes and results of the present invention will appear as the description proceeds. Adaptations of the invention are illustrated in the accompanying drawings in which.

Figure 1:
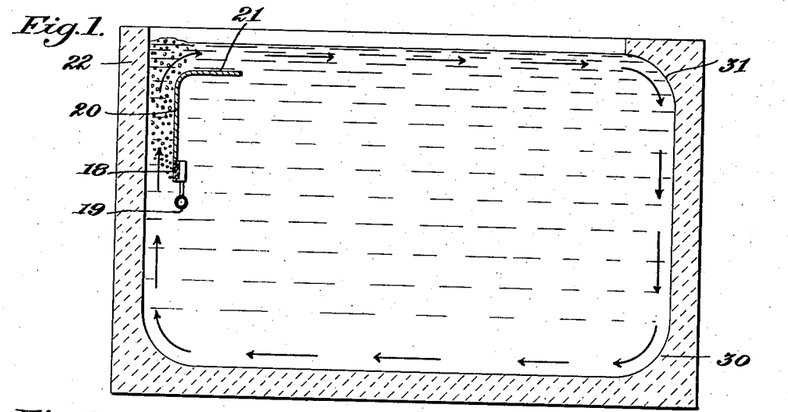
Figure 1 is a transverse sectional view of a sewage tank and Fig. 2 is a plan view thereof, portions being broken away.
Figure 2:
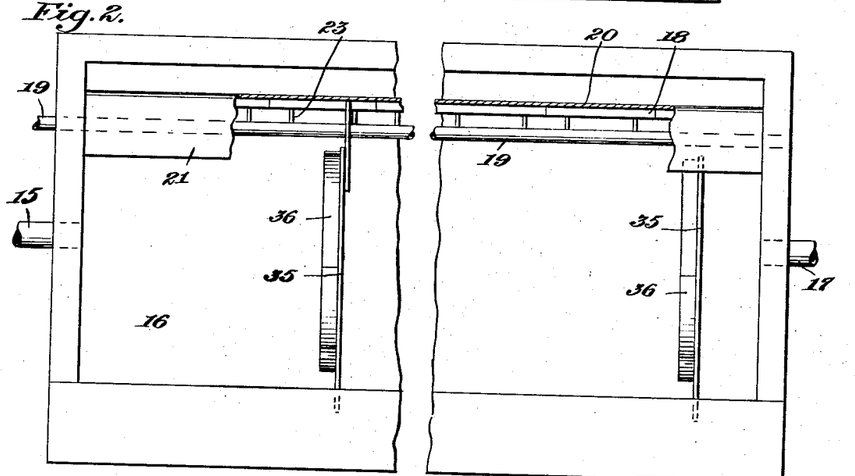

Assuming sewage to enter at the inlet 15 it will pass through the tank 16 and exit through the pipe 17. The size, length and proportions of the tank will vary with the requirements of the particular plant or the desires of the engineer or designer. The normal flow through the tank will be slow and in consequence there will be a marked tendency for heavier particles to settle out of the sewage. In order to keep the material in constant motion or to increase its speed, air under pressure may be let into the tank. It is well known in the art that such an inlet of air may cause circulation or movement of the sewage and also may make it possible for the sewage to receive and absorb oxygen which may be necessary to support the bacterial action which takes place and causes the sewage to be purified. The pressure of the air may be suitably controlled and the air introduced in a suitable manner and at suitable positions to cause a more or less regular movement of the sewage along desired, more or less predetermined paths. In Fig. 1 an air inlet box 18 is illustrated fed from an air inlet pipe 19. In order to economize on the introduction of air, the box 18 may be arranged at the position where the least quantity of air under the lowest pressure may be employed to accomplish the desired circulation. Such air economy of course leads to a material saving or reduction in consumption of energy in the operation of air compressers and, in some installations, may even lead to the reduction in number or elimination or omission of some compresser units employed. Obviously if air is let in at the bottom of the tank the entire pressure of the overlying sewage must be overcome. I have found, however, that substantially the same circulation as is produced by letting air in at the bottom may be produced more economically by letting in air at a higher point in the tank. As illustrated in Fig. 1, for instance, the air inlet box 18 may be arranged somewhat below the surface of the sewage but considerably above the bottom of the tank. The air inlet box 18 may be placed toward the side of the tank so as to leave between it and the tank a relatively narrow passageway through which the sewage may be drawn. The air inlet box 18 will preferably extend from end to end of the tank as indicated in Fig. 2 and rising therefrom throughout its length may be a baffle wall 20 which as shown in Fig. 2 extends upwardly and then turns toward the center of the tank forming an overlying substantially horizontal shelf or apron 21 which may be wide or narrow. Preferably the distance between the apron 21 and the surface of the sewage will be substantially the same as the distance between the vertical wall of the baffle 20 and the adjacent side of the tank.

In order to produce proper circulation of the sewage, it is necessary to confine the portion of the sewage containing the air. For this purpose a septum, partition or baffle 20 may be used, and while the term may not be absolutely apposite, the device so employed is herein referred to as a baffle. Such a baffle may be arranged approximately vertically and provide a vertically extending channel from bottom to top of the tank. The baffle need not, however, extend below the air inlet but frequently may be equally effective if extending only thereabove especially when the solid matters in the sewage are not too heavy.

Figure 11:
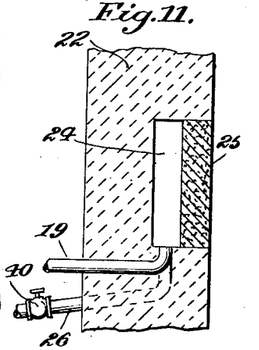
Fig. 11 is a transverse section on a somewhat enlarged scale of one form of air inlet unit.

When a suitable quantity of air at appropriate low pressure is introduced by the pipe 19 into the air inlet box 18 it will exude and be diffused into the sewage between it and the side wall 22 thus causing the sewage in the channel between the baffle and the wall to rise. As it reaches the surface of the tank much of the air will be freed and the moving sewage will pass across the tank and down on the other side across the bottom and up through the channel in substantially the direction indicated by the arrows in Fig. 1. This transverse circulation will combine with the longitudinal circulation produced by the inlet pipe 15 and the outlet pipe 17 causing a more or less spiral flow of sewage about and through the tank. The air pressure will preferably be regulated so as to cause the moving sewage to sweep across the bottom of the tank with sufficient energy to prevent settling of any of the heavier portions on the floor of the tank. The result of such operation will be that the contents of the tank will be kept in more or less constant motion. It will be provided with sufficient oxygen to support the purifying action of the bacteria and settlement or souring will be prevented. As illustrated in Fig. 2 the inlet box 18 may be divided into a plurality of sections fed by separate pipes 23 from the main air pipe 19 and in order to insure that sufficient air goes to each unit of the box 18 the pipes 23 may be varied in size or cocks may be provided in each to adjust the quantity of air fed to each section and so insure an even distribution of the air. I have discovered, however, that by making the air box as illustrated in Fig. 11, with an air chamber 24 having an air outlet into the sewage comprising a porous face plate 25, substantially automatic even distribution of the air throughout the entire length of the air box may be effected. Instead of employing a metallic perforated plate at the air inlet face 25 a porous plate may be employed. A satisfactory face plate for such purposes may consist of a block of a white, rigid, porous mineral substance composed essentially of silica which may be referred to as an artificial porous stone. The entire block is preferably of substantially uniform porosity, the structural conditions being analogous to a mass of capillary tubes, which tubes take a tortuous rather than a direct path through the block. The block is a mass of communicating pores and not a mass of sealed or closed cells. The result is that there is a tendency of the material to absorb liquid by capillary attraction and the vertically arranged porous face plate 25 when set into the sewage with no pressure behind it tends to fill its capillary structure with liquid which may pass through to some extent and enter the air chamber 24. The block nevertheless has a very low resistance to air pressure. While the volume of air passing through the block appears to be directly proportional to the pressure when the plates are dry, when the plates are water saturated, this does not seem to hold true, probably because the water in the plates is gradually forced out of the pores. It has been discovered then that when a long air box 18 running from end to end of the sewage tank is made up of vertically arranged blocks of this substantially uniform porous artificial stone, variation in air inlet connections and adjustable cocks are not necessary. The air box seems to more or less automatically adjust itself and with any fixed air pressure there is a substantially uniform outlet or distribution into the sewage throughout the length of the box. An increase in pressure does not cause the increase in air outlet at some points alone but is more or less evenly distributed through the entire length of the air box. Apparently at first the air exudes through the pores along the top of the face plate and as more air is needed and the pressure is increased, the air exudes progressively down the plate and more or less uniformly through the length of the box. Such an arrangement is extremely economical and is highly desirable since it allows of the introduction of air at a single point or at a small number of points without the intermediation of more or less complicated regulating machinery or devices.

The tanks commonly used in the activated sludge process in moderate size plants have a ratio of length to width from 10 to 20 with a length of travel frequently of several hundred feet in the passage of the liquid through the tank. It will be readily seen from the problem here presented and solved that the conditions obtaining in a tank of this sort are radically different in every way from tanks that may be used in the other arts in which it is desired to maintain a circulation of any sort. In very long tanks such as are ordinarily used in sewage treatment plants the more serious consideration is a proper distribution of the air so as to maintain a uniform circulation throughout the tank and to prevent dead spots. It is common practice in order to very finely divide the air to diffuse the air into the liquid through porous plates placed in the bottom of the tank at the lowest point. One of the characteristics of such porous plates is that removed from the liquid and in a dry state they will pass air very freely with a minute loss of head when air is passed at several times the rate ordinarily used in sewage treatment. These plates, however, when submerged become filled with the water from the liquid which closes the pores of the plate. In forcing air through plates under this condition it is characteristic of the plates that as the quantity of air being forced through the plate is increased, the pores in the plate are easily freed of their moisture content and a considerable increase in the amount of air passed through an individual plate will result in very little increase in the loss of head through the plate over that existing when a lower rate of air is passed through the plate. This might be compared to an orifice which would automatically open up as a greater amount of air is passed through it. This condition is a very unstable and sensitive one. Growths form on the plates tending to close the pores and if the plates were placed at the bottom of the tank inert materials such as sand would tend to blanket the plates and, unless an unnecessarily high rate of air is maintained, the plates would become clogged and all of the air would pass out through those plates which have not been clogged. This condition becomes exceedingly aggravated when any attempt is made under these conditions to reduce the amount of air being admitted to any one tank. The dead spots are in the bottom of the tank where they cannot be located or seen but where organic matter accumulates and, in the usual absence of a proper supply of oxygen, putrefies and upsets or destroys the entire process. This can be overcome in part by increasing the density of the plate and a proper distribution in any event can only be obtained together with stability of operation by sacrificing some head. By employing a proper porous face properly arranged for letting in air the system is stabilized and the reduction in the quantity of air used is practicable. The result of this practice is that not only a large saving is effected in the amount of power required but there is also a great improvement in the operation of the process as a whole. Further than this when the aerators are elevated above the bottom of the tank as here disclosed and particularly when flat vertically disposed porous plates are used at no time either when the process is in operation or interrupted are there any precipitated deposits on the diffusers with consequent clogging of the outlets. Where perforated pipes or other devices are used for the dissemination of the air into the liquid, it is still necessary and desirable to control the distribution of the air.

As illustrated in Fig. 11 the air may be introduced through the pipe 19 which preferably will come from below the air box 18 so that liquids seeping into it may flow out the pipe 19. There may, however, be provided an auxiliary outlet pipe 26 to receive and carry away seepage liquid. This provision of a separate pipe for air inlet and seepage liquid removal, while not essential, may be desirable under some circumstances. The pipe 26 may be provided with a suitable valve 40 for closing or suitably controlling the liquid outlet.

In Fig. 2 is shown an arrangement in which there are two pipes 23 going into each section of air diffuser. In blowing out the pipe 19 before operation, the liquid in the box 18 will flow out one or the other or both pipes 23 and during operation the liquid may flow out one pipe while air goes in the other.

In the operation of the system not only does the compressed air carry with it a certain amount of entrained moisture but also during interruptions in operation the submerged pipes and the containers for diffusion plates become filled or partially filled with liquid which must be drained away. Particularly after interruptions in service, it is desirable and necessary to quickly free the system of entrained liquid. In most cases where there are no traps in the pipes where the liquid outlets either from the porous plates or from perforated pipes or other devices are at the lowest point, the liquid will be eventually but slowly forced out of the air system. When the diffusion devices are installed as here proposed elevated above the bottom of the tank, if the air pipe feeding these devices is installed below the diffusers and a suitable drain pipe with valve or automatic trap used to drain this air header, the diffusers may be kept free at all times and the system put quickly in operation even after protracted interruptions.

Figure 3:
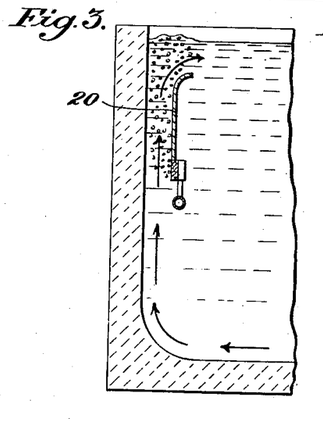
Figs. 3, 4, 5, 6, 7, 8, 9, 12, 13, 14, 15, 16, 17, 18, 19, 27, 28 and 29 are fragmentary transverse sections of tanks showing various forms of apparatus adapted to the invention.

While there may be a material advantage in extending the apron 21 in a horizontal direction at the top of the baffle 20 as an aid in directing the flow of the liquid into a more or less regular path or channel across the top of the tank, such apron may not always be necessary or desired and at Fig. 3 and elsewhere an arrangement is shown in which the baffle 20 is supplied with substantially no apron.

Figure 4:
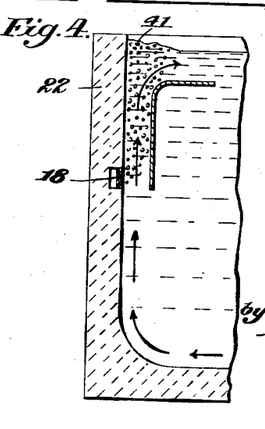
Figure 5:
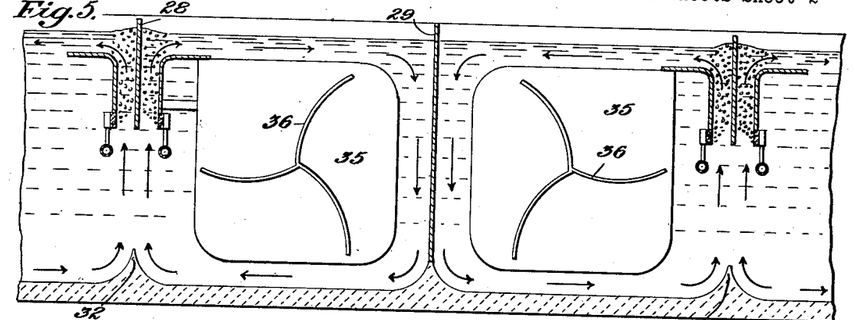
Figure 6:
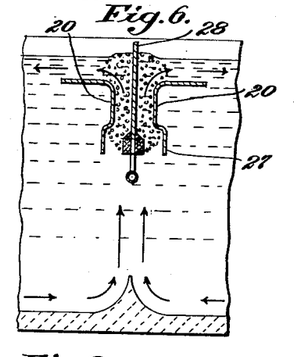
Figure 7:
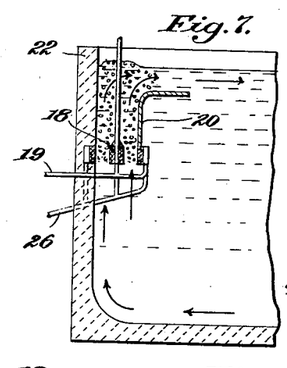
Figures 9, 12:
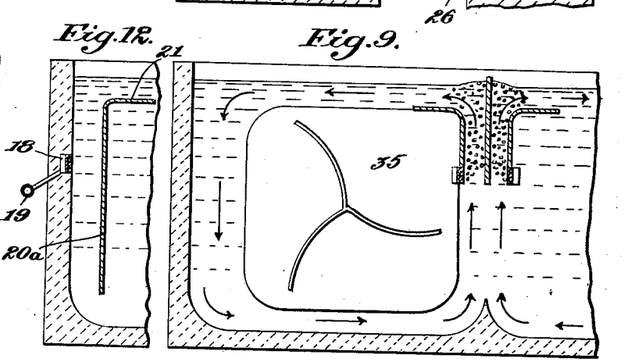
Figure 10:
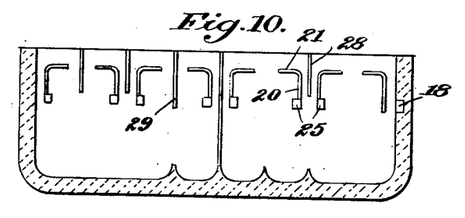
Fig. 10 is a transverse diagrammatic section of a tank showing optional arrangements.

In Fig. 4 is shown an arrangement similar to Fig. 1 in which the air inlet box 18 is arranged not in the baffle 20 but in the side wall 22 of the tank. This is the preferred arrangement as the tendency is for the bulge in the aerated water, indicated at 41 in this figure, to come mainly against the wall 22 so that the entire tendency may be to force the liquid toward the right in Fig. 4. In an arrangement such as Fig. 1 the high point in the surface bulge coming somewhat away from the side wall 22, there may be some tendency for a slightly backward or downward flow immediately against the wall although the result or persistency of such tendency generally is not of sufficient consequence to be detrimental to the operation of the system. In Fig. 7 is shown a composite arrangement in which an air inlet box 18 is shown in the baffle, another is shown in the side wall and a third air box with double porous plates is supported or suspended in the channel between the baffle 20 and the side wall 22. While such a structure as illustrated in Fig. 7 may be a desirable construction preferably all three of the air inlet devices will not be employed at the same time although they may be. Ordinarily it will be sufficient to construct or use an air inlet box either in the baffle 20 or in the wall 22 or arranged in the channel therebetween or when preferred any two or more of these arrangements may be combined. It will be noted in Fig. 7 that the installation of the air box 18 in the space between the baffle 20 and the wall 22 somewhat obstructs or impedes the inlet area so that the entrance to the channel at the bottom of the baffle 20 is of less area than the channel above. While this may not be an undesirable condition it may be corrected when desired by an arrangement such as shown in Fig. 6 in which the baffle 20 is turned outward at its lower end 27 to make the area of the channel between the bottom of the baffle and the air inlet box of substantially the same width as the upper portion of the channel. In Fig. 6 is illustrated a construction in which a broad tank may be employed and a double or plural spiral column produced therein. In such an arrangement there is a baffle 20 arranged on each side of the double faced air inlet box and rising from the air inlet box is preferably provided a baffle wall 28 rising above the level of the sewage in the tank to insure separation of the rising sewage into two divergent channels or paths. A somewhat similar arrangement is illustrated in Fig. 5 where the air inlet box 18 is arranged at the bottom of a baffle on each side of the separating wall 28. A plurality of these devices may be arranged in a wide tank and in order to prevent interference between adjacent circulating paths there may be provided a separating baffle or wall 29 which may when desired extend from the bottom of the tank and or may be extended to above the liquid level thus producing as indicated by the arrows in Fig. 5 a separated double or plural spiral flow. A similar arrangement is illustrated in Fig. 9 in which the circulation is produced by an air inlet device separated from the side wall of the tank a sufficient distance to provide a circulatory path between it and the air inlet device. In Fig. 10 is illustrated diagrammatically a plurality of air inlet boxes, baffles and dividing walls all or any suitable number of which may be employed together indicating the flexibility of the system and its adaptability to tanks of various sizes or widths. In some instances for structural purposes it may be desired to build relatively narrow tanks. When, however, it is desired to install the present invention into sewage disposal systems having tanks already constructed, it may easily be done no matter what is the width of the tank to be used by appropriately selecting and arranging the proper units to produce the desired or complete circulation or circulations.

The device for admitting air into the liquid, whatever form it may take, is placed at some point considerably above the bottom of the tank but in general no definite point can be fixed for the depth of submergence of the diffusing device as this depth of submergence will vary in tanks of different proportions. This depth may vary with some function of the velocity of the mixture of air and water passing through the device, with the area or width of the opening through which the liquid passes, and possibly inversely with the rate at which the air is injected into the liquid. In turn then the velocity through the device and the quantity of the liquid to be passed through the device will depend upon the minimum velocity that it is necessary to maintain across the bottom of the tank to prevent the deposition of organic and other solids and upon the dimensions of the tank. In orded to operate the device or system with a minimum amount of power it is necessary to properly balance all of these factors. An increased submergence of the air inlet will increase the amount of pressure required but will require less air to maintain the same velocity and quantity of liquid passing through the device and vice versa but for each condition within reasonable limits it is possible to fix a preferred depth of submergence and to increase the circulation in the tank by the admission of additional air but with a sacrifice in efficiency. As the dimensions of the tank are increased the proper depth of submergence for a minimum of power consumption will be rapidly increased and it might become necessary to place the aerators at the bottom of the tank where the only improvement over present practice would be due to the confinement of the rising column of air and water which would reduce the quantity of air necessary to properly maintain the circulation. Before this point in the submergence of the aerator is reached, however, it would be much more economical to install either an additional set of aerators on the opposite side of the tank from the first aerators with the two circulating columns of liquid meeting in the center of the tank and from thence passing downward then diffusing and returning for re-aeration to the aerators or the equivalent installation of a pair of aerators at the center of the tank or in some instances with very wide tanks the improvement can be realized by the installation in pairs of several sets of aerators more or less uniformly spaced with reference to their sphere of influence across the tank. This arrangement may be particularly valuable where large tanks previously constructed as parts of a sewage disposal plant are available for conversion into aeration tanks whereas at the present time it is frequently necessary to discard or destroy such tanks in order to install improved processes.

The successful operation of the forms that the device or devices may take will in a measure be affected by obstructions in the path of the liquid through the device and where the aerators may be installed in the passageway through which the liquid passes in the device the confining means used to guide the mixture of air and water should be so shaped as to maintain as nearly as possible a practically uniform velocity of the particles of liquid through the device in order to avoid the losses attendant either upon eddying or that would otherwise be necessarily expended in accelerating or retarding the liquid. The liquid having been set in motion tends to remain in motion but when freed from air at the surface of the liquid in the tank, tends to diffuse and to short circuit through the tank and to return through the aerating area. In a tank equipped with a single aerator a critical point in the circulation may be in the corner of the tank at the bottom most remote from the aerator where a sufficient velocity must be maintained to prevent the deposition of solids. While it is necessary and desirable to keep the entire contents of the tank turning over, it is particularly necessary to maintain a scouring velocity throughout the entire bottom of the tank. In order to insure this the liquid upon leaving the aerating device at the surface of the liquid in the tank must take as nearly as possible a horizontal direction at the surface of the liquid. This moving layer at the surface of the liquid then will largely pass across the tank and down on the opposite side and return along the bottom under the influence of inertia and centrifugal force. During the operation of the tank a sufficient amount of the aerated liquid set in motion by the device may be diffused through the tank to maintain the necessary supply of oxygen for the biological process taking place in the tank. In order to guide the liquid in a horizontal direction at the surface of the liquid a slight amount of deflector above the liquid and at or near the surface will under certain conditions prevent the liquid falling back into the device when air is freed from the mixture at the surface but for mechanical reasons it is desirable as quickly as possible to free the liquid of its surplus air, which in escaping produces eddying currents, and to smooth out the flow in a horizontal direction. A horizontally disposed guide below the surface of the liquid may be effective in some instances in producing this result.

It must be borne in mind that, in order to reduce the amount of power both by reducing the pressure to which the air is compressed and by reducing the quantity of air used, which normally is greatly in excess of the amount required for the biological process, advantage should be taken of the low velocities that are necessary to keep the solids in the sewage in suspension and prevent their deposition. The necessary velocity across the bottom to accomplish this ordinarily ranging from three tenths of a foot per second upward which would seldom necessitate a velocity through the aerating area in excess of one and one half feet per second. Further the ratio of the amount of air required to be injected into the liquid may be of the order of three percent of the quantity of liquid passing through the aerating device.

The expedient has been adopted and indicated of curving the lower corners of the tank as indicated at 30. The upper corners of the tank on one or both sides may also be curved as indicated at 31 and as indicated at 32, when a plurality of circulations are to be set up in the tank, it may be desirable to install a short mound or ledge forming curved surfaces for the passage of the circulation at appropriate points in the bottom of the tank. These and other details illustrated are refinements not essential to the main features of the invention but which may be desirable and may, under appropriate conditions, aid the efficiency of the device.

Figure 8:
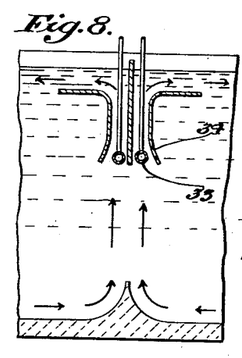

The inlet of air preferably will be provided through boxes such as described having porous faces. When these faces are arranged as indicated and set in a vertical direction, they will be self-cleaned as, even when operation is stopped, no sewage will settle upon and clog them. It may, however, be desired to use other forms of air inlet and their exclusion is not contemplated in all phases of the present invention. In Fig. 8 is shown an arrangement by which pipes 33 extending throughout the length of the tank either porous or provided with suitable perforations or outlets may be employed for introducing air. In such an arrangement it may be desirable to curve or bend outward the lower ends 34 of the baffle walls so as to preserve substantial uniform cross section throughout the air-carrying channel.

Figures 17, 27, 28, 29:
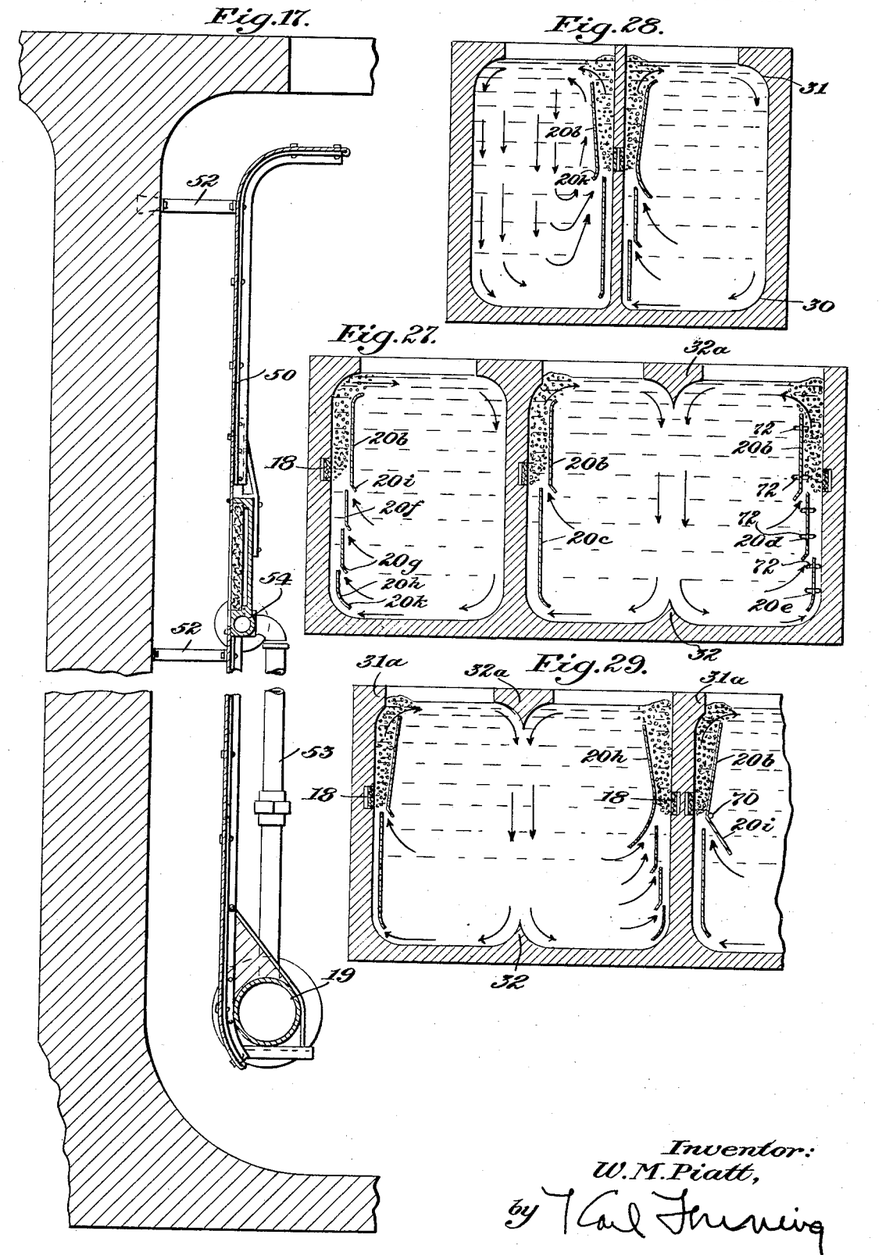
Figure 18:
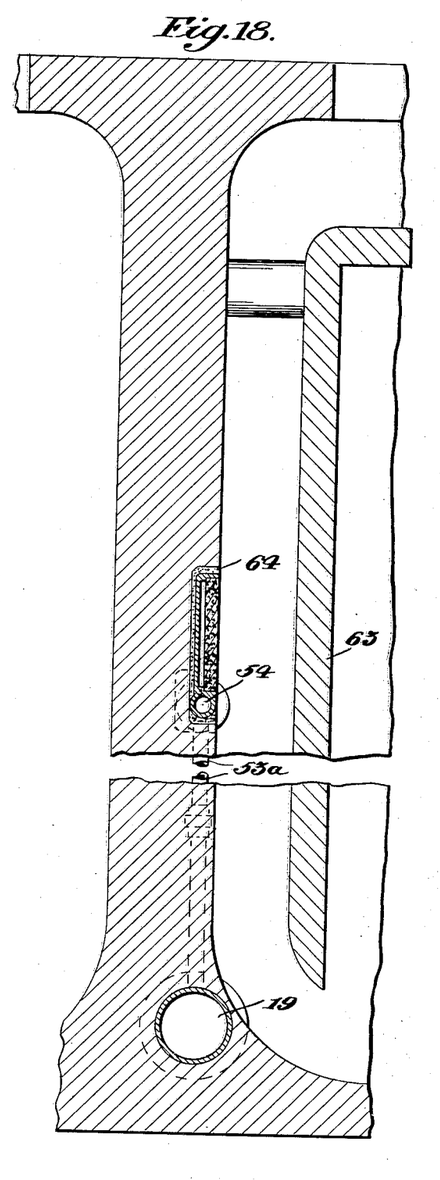
Figure 19:
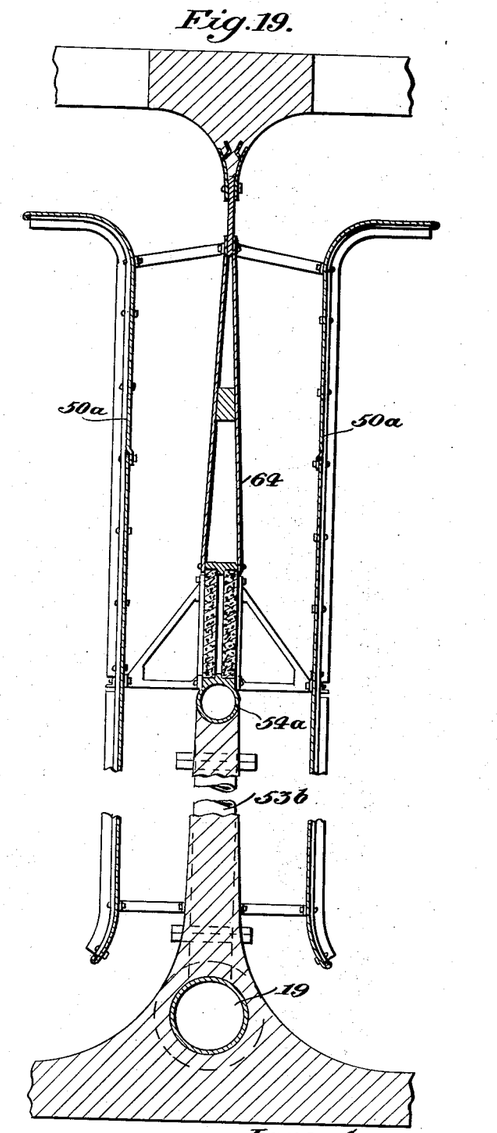
Figures 20, 21, 22, 23, 24, 25:
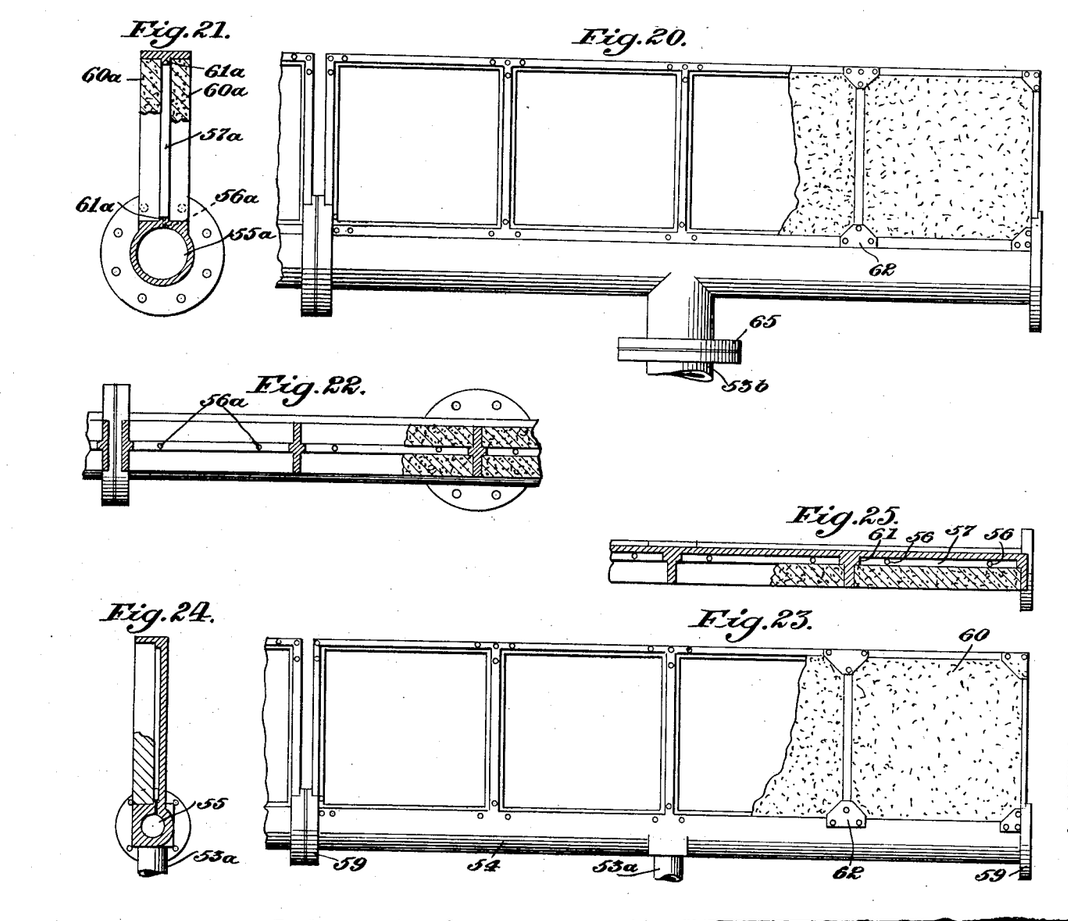
Figs. 20 and 23 are front elevations of types of air inlet units.
Figs. 21 and 24 are vertical sections of Figs. 20 and 23.
Figs. 22 and 25 are fragmentary horizontal sections of Figs. 20 and 23.
Figure 26:
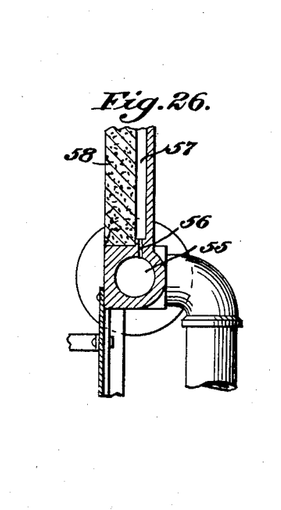
Fig. 26 is a fragmentary vertical section through an air inlet unit such as is illustrated in Fig. 17.

For carrying out the aeration and especially for insertion in tanks already constructed it may be desirable to employ some such arrangements as shown in Figures 17 to 26. In Fig. 17 is shown a sheet iron baffle 50 suitably supported, for instance, by bars 52 and carrying at its lower edge the main air inlet pipe 19 from which rises the pipe 53 going to the air distribution unit 54 carried in the baffle 50. As illustrated in Fig. 26 the pipe 53 enters the side of the unit 54 which has an air channel 55 in its base communicating through vertical inlets 56 with the air chamber 57 lying behind the porous plate 58 as illustrated in Figs. 23 and 25. The unit 54 may consist of a connection provided with flanges 59 at its ends for connection with adjoining units. The unit 54 is cast so as to hold a suitable number of porous air transmitting plates 60. The number of these plates in a unit is not essential to the present invention, but four are illustrated. The porous plates 60 rest upon supports 61 leaving behind them the air channel 57. Behind the plates entering the air channel 57 are inlets 56 as illustrated. Two of these inlets are provided in association with each porous plate or set of porous plates and air may enter both or may enter one while liquid is running out the other. The porous plates 60 are held on their seats 61 by means of surface plates 62 suitably held for instance by bolts tapped into the casing 54. When it is desired to employ the units 54 in the wall of a tank the arrangement indicated in Fig. 18 may be suitable. With the arrangement any suitable baffle may be employed, a cement baffle 63 being illustrated. In Fig. 18 the unit 54 is supplied with air from the main supply pipe 19 which may be embedded in the bottom of the wall through a vertical pipe 53a, also embedded in the wall and entering the bottom of the unit 54. As a matter of convenience the unit 54 may be embedded and held in the wall of the tank by means of cement or other adhesive or other filling material 64. In Fig. 19 is shown an arrangement of double-faced units. The air inlet pipe 19 embedded in the base of the tank is connected with upright pipes 53b entering the units 54a which may be supported by the pipes 53b and also surmounted by plates 64 extending to the top of the tank. This structure makes a definite partition in the tank. At each side thereof may be supported baffles 50a, here illustrated as of sheet iron or of other suitable material. The units 54a are illustrated in detail in Figs. 20 to 22 where it will be seen connection is provided for the pipe 53b by means of flanges 65 so that air may be let into the air chamber 55a from which air passages 56a rise to the air chamber 57a provided between the oppositely disposed seats 61a so arranged that the porous plates 60a may rest on the oppositely disposed seats and form opposite side walls to the chamber 57a being held in place by suitable means such as the plates 62.

The specific arrangement for supporting or holding the various arrangements here described is not essential to the invention, but illustrate practical embodiments thereof.

The spiral circulation of sewage as indicated above seems to have proved to be the most satisfactory and efficient method of agitating and aerating or oxidizing sewage and it is adapted to many varying conditions. No matter how thorough the agitation and circulation of the sewage in any such system, it has been discovered, however, that on ceasing operations coagulations and sour spots seem to exhibit themselves. Likewise sour or untreated sewage may be mixed with the outflow from the tank during operations. In any such a spiral circulation apparently the oxidation of the sewage in the interior of the tank is very slight and due to centrifugal effect there is a tendency of the lighter particles to collect and remain near the center or axis of rotation of the sewage. This interior movement of the sewage at the center frequently is not sufficient to keep it broken up. As illustrated in Fig. 1 for instance, by the arrows, the circulation is circumferential of the tank and the movement in that path is reasonably and operably rapid and there may be sufficient oxidation there. This oxidized layer, however, at least on the left hand end of Fig. 1, will be limited to a layer approximately as thick as the distance between the baffle 20 and the wall 22 of the tank and it has been observed in actual operation that apparently the oxidation of the sewage in the circumferential path does not persist inward to the center. Probably most of the free air leaves the sewage in its passage across the top of the tank and there is no tendency for the aerated outer layer to pass into the center of the whirling mass or vice versa. Therefore the central core, while rotating and moving in proportion to its axial distance from the axis of rotation, may not receive sufficient oxygen and the sewage in it, therefore, may not be subjected to the purifying bacterial action. The rapid downward movement of the oxidized sewage at the right of Fig. 1 may be in a channel substantially the same width as the opening between the baffle 20 and the wall 22 or possibly somewhat wider. Likewise the rapid movement of the oxidized sewage at the top and at the bottom of the tank in the transverse direction may be limited to a similarly relatively narrow path, the inner portion of the sewage moving more slowly and remaining substantially isolated from the air and so substantially unaffected by the purifying bacteria and subject to those bacteria which thrive in absence of air and cause putrefaction.

Since the sewage at the interior obtains oxygen, if at all, only apparently by contact with the rapidly moving outer layer, there is a tendency for the sewage at the center of the tank to collect, coagulate and become sour. In order to avoid this it may seem desirable to provide some means for breaking up and spreading or distributing this central mass, and one phase of the present invention is directed toward this end.

A deflector may be used including a plate or a series of plates 35 arranged transversely across the tank 16. The plates may be supported by the baffles 20 or the apron 21 or both or in any other suitable way and may be arranged at a suitable angle thereto. Preferably they will be at a right angle to the baffles 20. The plates 35 need not reach to the edge of the sewage, that is, they are placed close to the baffles 20 and the space left between their edges and the sides and bottom of the tank may be at least approximately the width of the aeration channel formed by the baffle 20. Likewise the tops of the plates 35 may be below the liquid level a distance at least approximately equal to the width of the air channel formed by the baffle 20. The exact size of the plates 35 is not essential and it may be found desirable to make them somewhat larger than indicated or they may be made considerably smaller than indicated. Mounted on the plates 35 are vanes or blades 36. Any suitable or desired number may be employed, three or four being shown in the drawings. The vanes 36 are curved or bent and may extend radially from any point such as about the center of the plates 35 which may be about the center of the tank or at least the center of the area surrounded by the sewage moving in the spiral path. The motion of the sewage in the spiral path may tend to draw sewage from the center along the vanes 36 and mix it with the circumferential spirally moving sewage where it may be aerated, circulated and acted on by the bacteria. The forward movement of the sewage in the tank from the inlet 15 to the outlet 17 may tend to force the center portion of the sewage against the plates 35 where it meets the diverting vanes 36.

In Figure 5 the plate 35 is illustrated as separated some distance from the vertical portion of the baffle 20. In Fig. 9 the plate 35 extends to the baffle 20. In both figures the plate 35 is below the sewage level and is above the bottom of the tank and away from the side wall. In Fig. 11 the plate 35 is shown as extending from the bottom of the tank to above the sewage level and as running to the side of the tank. In this arrangement the only channel for sewage to pass from one side of the plate 35 to the other is between the baffle 20 and the adjacent wall and therebelow. This allows sufficient space for movement of the sewage and may be desirable in some instances.

As the material in the tank approaches the plate 35 the vanes 36 cause the material in what may be referred to as the central core to be diverted into the outer or circumferential portion which is aerated and has a more pronounced circular movement. This increment of material coming from the core increases for the time being the quantity of liquid at the circumferential layer. Substantially the only portion of the circumferential layer which can go forward is the quantity measured by the needs of the forward flow as produced by the inlet. The additional or surplus quantity of liquid supplied from the central core may cause a slight bulging or lifting of the liquid level at that point and some of the liquid will then be caused to flow in the opposite direction spirally toward the inlet end of the tank and eventually liquid from the outer area will be drawn into the core near its beginning end thus producing an increased circulation or distribution of the sewage for its better admixture with the aerated sewage mixture.

Figure 13:
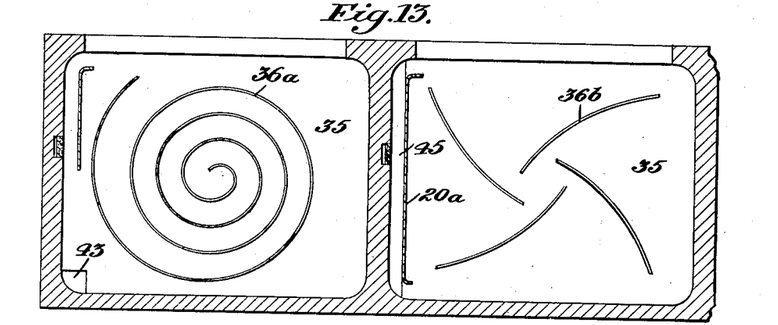
Figure 14:
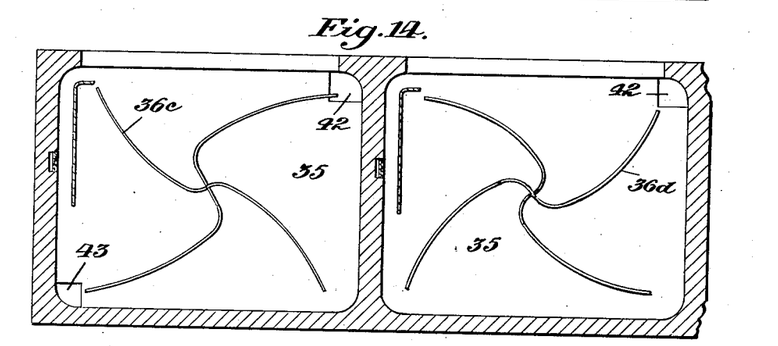
Figure 15:
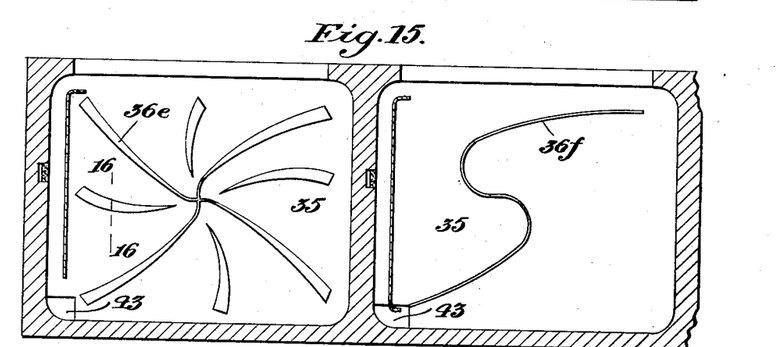

In Figs. 13, 14 and 15 the plate 35 is shown extending entirely across the tank. Some opening through or around the plate must be provided for passage of material toward the tank outlet. Openings 42 and 43 are shown at top and bottom of the plate but it is obvious one or the other of these might be omitted or any suitable number of openings might be provided at any other suitable places in the plate. In Fig. 13 the plate 35 at the right extends to top and bottom of the tank but does not extend beyond the baffle 20a and forward movement of sewage may continue through the opening 45 between the baffle and wall.

Figure 16:
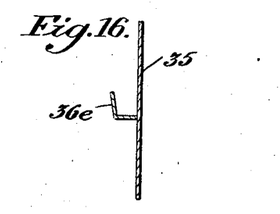

Different types of vanes 36a, 36b, 36c, 36d, 36e and 36f are illustrated. Fig. 16 shows a section at 16—16 of Fig. 15 indicating that the edge vanes 36e are bent to form cutting edges. The vanes 36d are set to cause counter-clockwise movement of sewage. As the swirling sewage meets these vanes it will be drawn from the circumference toward the center thus forcing out and mixing the sewage at the center. It is immaterial for some purposes whether the mixing is done by vanes adapted to force material from toward the center outward or from toward the circumference inward. The vanes may be fixed with their effective centers at the centers of the tanks but as illustrated by the vanes 36f they may be off-center, preferably toward the baffle and possibly produce an improved effect.

The effect of the arrangement and operation described will be to increase the movement of the sewage and to decrease its tendency to collect or remain approximately quiet at the center. No sour, coagulated, central core may be formed or if formed it may be broken up and not allowed to persist. The tendency thus will be to introduce all of the sewage in the tank into the moving outer layer and thus tend to insure purification of the entire mass of the sewage. While the deflecting plates and vanes have been illustrated and described in connection with the specific means here illustrated for producing the spiral flow of sewage, it is obvious their operation and function is not necessarily confined to use therewith. When sewage is treated in a tank in which there is a spiral flow produced by any means, the employment of some such means as here described for breaking up the core and spreading and dispersing it is desirable and of importance, and the present invention applies thereto.

Instead of employing the well known spiral method of treating sewage and allowing the formation at the center of what has been referred to as a core, it may be desirable to procure substantially the same effect by what is in substance a combined forward and rotary movement of the sewage in such a way as to substantially prevent the formation of the undesirable core. To this end structures such as illustrated in Figs. 27, 28 and 29 are adapted. Because of convenience and economy in construction ordinarily the so-called spiral treatment of sewage has been generally conducted in tanks whose cross section is circular or substantially square or even wider than deep. It has been found, however, that the material revolving in the tanks behaves very materially differently when the cross section of the tank is such that the width is considerably less, than the depth of the liquid in the tank. The width may for instance be about 60% of the depth. By installing a pair of aerators in the center of the tank that would otherwise have an approximately square or oblong cross section this more favorable cross section may be procured without a substantial change in the masonry itself, as indicated in Figs. 27, 28 and 29. Such an installation may give virtually two tanks in which the width of each is approximately 50% of the depth and under these conditions much of the tendency for the formation of a central core is eliminated.

It is also found that the formation of the core may be substantially avoided by the division of the baffle in any tank into several sections thus providing a plurality of points at which the liquid sewage may be drawn into the influence of the uprising aerated column. This arrangement is particularly effective when the tanks are of the proportions indicated above. In Fig. 27 a septum, partition or baffle 20b is illustrated above a septum, partition or baffle 20c which extends from about the bottom of the baffle 20b to substantially the bottom of the tank. The lower baffle or partition 20c as indicated may be placed closer to the adjacent side wall of the tank than is the upper baffle 20b. The lower baffle 20c may be divided into two sections, 20d and 20e, or into three sections, 20f, 20g and 20h, each lower section in turn being preferably placed nearer the adjacent side wall than the one immediately above. In this arrangement, as indicated by the arrows, sewage will be drawn from toward the center of the tank into the influence of the aerated column at the several points between the baffles and between the baffle and the bottom of the tank. By this arrangement at some time in its passage through the tank all of the sewage thus is brought into contact with the air. The lower edge of the individual baffles may be provided with a straight lip 20i or a curved lip 20k to aid in directing the course of the travel of the sewage. Likewise the top of the baffle 20b may be slightly curved although it may be desirable to have it straight up as indicated at the right in Fig. 27 and in Fig. 29. At the right in Fig. 29 the directing lip 20i is indicated as somewhat larger than in the other sections and connected by a hinge 70 with the upper baffle section 20b. By this arrangement the lip 20i, whatever its dimensions may be suitably adjusted angularly to procure the best result and the upper baffle, say 20b, likewise may be adjusted angularly to procure the best result. In most instances the confining baffle associated with the air inlet has been indicated as substantially vertical and parallel with the side wall of the tank and this may be a satisfactory and desirable arrangement. The tendency, however, of the air in the aerated material rising in the channel to expand may make it desirable to have the baffle 20b arranged at more or less of an angle to the side wall of the tank so that the channel will be larger at its top than at its bottom and such an arrangement is indicated at Figs. 28 and 29. The air inlet in Fig. 28 is indicated at the center of the tank there being a circulation on both sides thereof. In Figs. 27 and 29, however, the air is let in at both sides of the tank and it may be desirable to provide the inclined or curved longitudinal strips 32 in the bottom of the tank with which may also be associated if desired the overhanging longitudinal strips 32a which may be provided with curved separating elements depending into the sewage. While this arrangement may be desirable, it is not necessary. In connection with the installation, the upper walls may be provided with the in-curved over-hanging indicated at 31 or the wall may rise straight as indicated at the right hand end of Fig. 27 or there may be a slight or partial over-hanging as indicated at 31a.

All the baffles may be adjustable in angle and to and from the side wall and to each other and thus the width of the up-rising sewage channel and its sections as well as the opening between the baffles may be changed or adjusted to suit conditions. Such adjusting means may be of any suitable type. In Fig. 27 the baffles 20b, 20d and 20e are shown mounted adjustably in slots 72.

In Figs. 27, 28 and 29 the air inlet device has been indicated as built into the wall or partition but this obviously is not essential and any of the other arrangements might be applied. The purpose of this is to let in air between the wall and partition and the baffle 20b and this might be done by placing the air inlet box or pipe in or on the wall or the partition or baffle or suspending it between the baffle and the wall as variously indicated in other figures of the drawings.

The effect of inclining the baffle 20b may in a way be accomplished as shown in Fig. 19 by inclining the upper plates 64 of the wall or partition by which arrangement also the upper portion of the channel through which passes the aerated sewage is larger than the lower portion of the channel. The term "substantially vertical" is used in the claims to refer to the wall surfaces or baffles whether they be as nearly vertical as possible or definitely inclined one way or the other from vertical as described.

By providing a suitable number of baffles below the aerator as indicated in Figs. 27, 28 and 29 and by placing each baffle away from the wall at appropriate distances the increased area will provide for the additional liquid entering the several ports between the baffles and this will almost completely prevent the formation of any core whatever and the small amount of sewage which may actually revolve across to and in front of the main upper baffle 20b above the aerator seems to work readily up into the main current at the top. By properly proportioning the widths between the baffles and below the bottom baffle, it is possible to maintain a very satisfactory velocity at the bottom of the tank and to prevent settlement at this point of solid sewage or sand and other heavy materials which may have been admitted into the tank. The sewage layer passing across the bottom of the tank by this arrangement may be thinner than in the other devices described but its sweeping effect on the bottom may be equally efficient. Under appropriate conditions satisfactory results in this respect may be accomplished by a single lower baffle 20c or by a plurality of such baffles as indicated at 20d to 20k. It is obvious that more than three such baffles might be employed if desired, the actual number depending on the conditions met.

Directing strips 20i projecting angularly from the baffle 20b are indicated. These might be entirely omitted or they may be curved as indicated in Figs. 28 and 29.

Possibly the most satisfactory as well as the simplest and most easily manufactured and installed arrangement is one comprising a double aerator installed at the center of the tank with both sides arranged as shown at the left of Fig. 28, that is with one port at the bottom of the tank under the aerators and one at or just below the aerator. The actual construction of such a device might well be a very slight adaptation of the construction illustrated in Fig. 19. As indicated in that figure, the increase in cross section toward the top of the channel for aerated sewage need not be great due to the small amount of air present with the amount of liquid passing through the device, nevertheless, it may be desirable to provide for the expansion occurring. In some of the drawings the outward inclination of the baffles is somewhat exaggerated but the actual position will be dictated by results desired or procured in actual practice.

While the bulk of the forwardly passing material in the tank will pass through the aerated channel between the baffle 20b and the adjacent wall, there may be some tendency for sewage to rise on the other side of the baffle 20b as indicated by the arrows at the left of the baffle in Fig. 28 and this rising sewage will also tend to join the general transverse travel at or toward the top of the tank. In order to allow freedom in this respect, it may be desirable to omit any lip or overhanging at the top of the baffle 20b as indicated at the left of Fig. 28 and in order to accomplish the purpose herein indicated, it may seem desirable to forego the benefits which might otherwise accrue from such a horizontal apron as indicated at 21 in other figures of the drawings.

The invention is not confined to the specific forms, proportions or assemblages of apparatus illustrated, as changes therein may suggest themselves to be made when installing and operating in accordance with the engineering experience, ingenuity and ability of those dealing with sewage.

I claim as my invention:

1. In a sewage treatment tank in which there is a spiral flow of sewage, a transverse baffle and curved vanes on the baffle.

2. In a sewage treatment tank through which sewage flows, means for setting up a spiral flow therein, and means for causing sewage near the circumference to approach the central axis of the spiral in which the sewage flows.

3. In a sewage treatment tank, means for causing a spiral flow therein, and means toward the center to cause the circumferential movement to draw material from the central axis of the spiral in which the sewage flows.

4. In a sewage treatment tank, a dividing means above the bottom in the sewage and extending thereabove, a baffle at each side of the dividing means and extending from substantially its bottom to a distance below the top of the sewage, and means for letting in air under pressure between the dividing means and each baffle comprising an air chamber at the bottom of the dividing means having oppositely disposed vertically arranged porous air outlet plates, and an air supply pipe therebelow and separate connections thereto for outlet of water and sewage seepage and inlet of air.

5. In a sewage treatment tank, a dividing means above the bottom in the sewage and extending thereabove, an air inlet means at the bottom of the dividing means, a vertically disposed porous plate at each side of the air inlet means each to allow air to enter the sewage at opposite sides of the dividing means so as to cause an upward circulation of sewage on both sides of the dividing means, and a baffle at each side of the dividing means and air inlet means separated therefrom and curved so as to provide a channel of substantially equal cross section throughout its height for the uprising sewage, each baffle extending from substantially the air inlet means to below the surface of the sewage.

6. In a sewage treatment tank means for causing the sewage to pass through a substantially rotary path, means to surround at least a part of an upward portion of the path and means to cause sewage at a plurality of levels to enter the said upward portion of the path.

7. In a sewage treatment tank, having a substantially vertical surface, a more or less vertical baffle below the sewage level forming a channel with the surface, means for letting air into the channel, a baffle below the first baffle and forming a second narrower channel between it and the surface, and inlets for sewage at the bottoms of the baffles.

8. In a sewage treatment tank, having a substantially vertical surface, an adjustable substantially vertical baffle below the sewage level forming a channel with the surface, means for letting air into the channel, a baffle below the first baffle and forming a second narrower channel between it and the surface, and inlets for sewage at the bottoms of the baffles.

9. In a sewage treatment tank, having a substantially vertical surface, a substantially vertical baffle below the sewage level forming a channel with the surface, means for letting air into the channel, a baffle below the first baffle and forming a second narrower channel between it and the surface, and adjustable inlets for sewage at the bottoms of the baffles.

10. In a sewage treatment tank, having a substantially vertical surface, a substantially vertical baffle below the sewage level forming a channel with the surface, means for letting air into the channel, a series of baffles therebelow each forming a narrower channel between itself and the surface than the one next above, and inlets for the sewage at the bottoms of the baffles.

11. In a sewage treatment tank, having a substantially vertical surface, a baffle below the sewage level inclined away from the surface forming a channel with the surface, means for letting air into the channel, a baffle below the first baffle and forming a second narrower channel between it and the surface, and inlets for sewage at the bottoms of the baffles.

12. In a sewage treatment tank, having a substantially vertical surface, a substantially vertical baffle below the sewage level forming a channel with the surface, means for letting air into the channel, a series of baffles therebelow each forming a narrower channel between itself and the surface than the one next above, inlets for the sewage at the bottoms of the baffles, and means for adjusting the baffles.

13. In a sewage treatment tank, having a substantially vertical surface, a substantially vertical baffle below the sewage level forming a channel with the surface, means for letting air into the channel, a baffle below the first baffle and forming a second narrower channel between it and the surface, inlets for sewage at the bottoms of the baffles, and means for adjusting the baffles.

14. The method of treating sewage comprising imparting a rotary movement to sewage in a tank by injecting air under pressure near one periphery, and deflecting sewage near the center of the rotating mass to move it toward the outer edge of the rotating mass.

15. The method of treating sewage comprising imparting a rotary movement to sewage in a tank by injecting air under pressure near one periphery to cause an upward movement of sewage through an enclosed path at that point and directing sewage to enter the upward flow in said enclosed path at a plurality of levels.

16. In a sewage treatment tank having a substantially vertical surface, a substantially vertical baffle below the sewage level forming a channel with the surface, means for letting air into the channel, a baffle below the first baffle and forming a second channel between it and the surface and inlets for sewage at the bottoms of the baffles.

WM. M. PIATT.